Feb. 4, 1969 — A. KLEIN — 3,425,481
COVERING SYSTEM FOR GUIDING PATHS OF MACHINE TOOLS
Filed Oct. 12, 1966

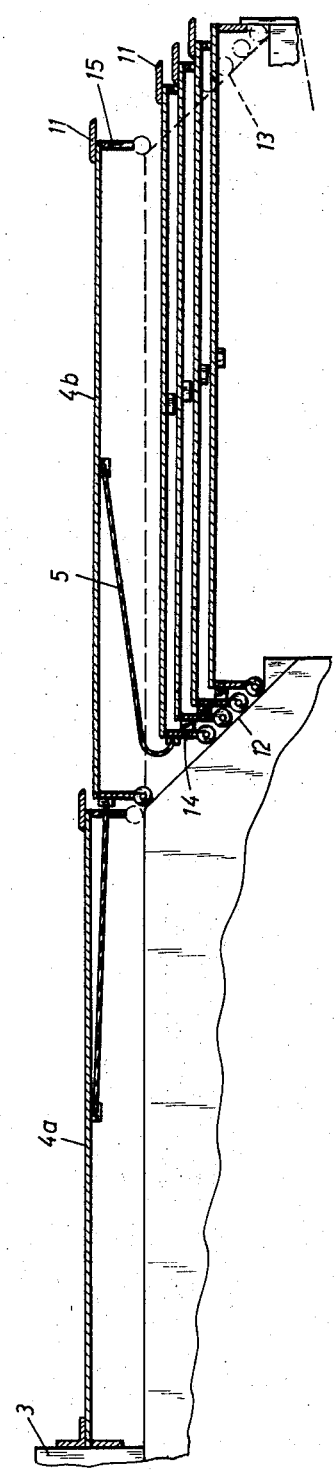

3,425,481
COVERING SYSTEM FOR GUIDING PATHS OF
MACHINE TOOLS
Arthur Klein, Netphen, Germany, assignor to
Kabelschlepp G.m.b.H., Siegen, Germany
Filed Oct. 12, 1966, Ser. No. 586,128
Claims priority, application Germany, Oct. 14, 1965,
K 57,388
U.S. Cl. 160—202            2 Claims
Int. Cl. E06b 3/92; E05d 15/12

ABSTRACT OF THE DISCLOSURE

A covering arrangement for the ways of a machine tool having a carriage movable along the ways. The arrangement comprises a plurality of plate-like members which rest in superimposed relation in a recess at one end of the ways and the uppermost member is connected to the carriage to be moved thereby. Each member has a flexible element connected to the underside in the middle and to one end of the member next therebeneath. As the carriage moves away from the recess the members are pulled out of the recess one at a time and follow the carriage in abutting relation. When the carriage moves toward the recess the members move one at a time down into the recess and rest therein in superimposed relation.

The present invention concerns covering means for the guiding paths of machine tools or the like with a plurality of cover plates adapted to be displaced one above the other. These plates are intended to prevent impurifications in liquid or solid form from entering the guiding paths of machine tools. To this end, the said plates have to follow the movements of the machine element sliding on the guiding paths. The individual cover plates are coupled to each other and at the joints or butts are sealed against the entry of impurifications.

With heretofore known customary covering means of the type involved, the ends or front edges of the plates are equipped with coupling elements so that at the joints or butts of two plates, one plate has to overlap the other. However, it is difficult and not possible without special means, properly to seal the said overlapping portions.

It is, therefore, an object of the present invention to provide a covering arrangement of the above-mentioned general type which will overcome the drawbacks outlined above.

It is another object of this invention to provide covering means of the type set forth above, in which a simple but effective seal will be assured at the butts or joints.

These and other objects and advantages of the invention will appear more clearly from the following specification in connection with the accompanying drawing, in which:

FIGURE 1A is a view similar to FIG. 1 but with the lead panel shown in the non-superposed position;

Figure 3:
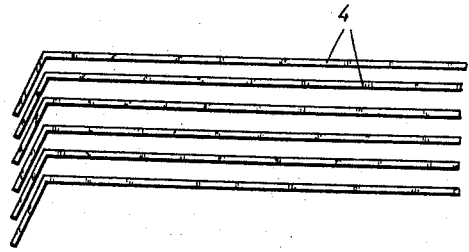

FIGURE 3 diagrammatically illustrates a view of the piled-up plates.

The present invention concerns an arrangement for covering machine tool ways as a carriage supported on the ways moves thereon. The arrangement employs a plurality of plates which rest in superimposed relation at one end of the ways with the uppermost plate connected to the cariage. The plates are pulled out one at a time into abutting relation and completely cover the machine tool ways.

The covering arrangement according to the present invention is characterized primarily in that each two adjacent cover plates are connected by pulling members, for instance, ropes, cords, or the like. The pulling member may be connected to the center of one and to the end face of the respective other adjacent plate. When the machine part pulls or takes along a cover plate, also the second plate and every further plate is pulled by the rope or cable. The plates may engage each other in a blunt manner so that the butts can be covered by a strip in a simple manner, in this way a simple but effective seal at the butts will be obtained.

In practice the cover plate may be provided with supporting rollers adapted to roll on separate paths on the machine. At the end of the guiding paths, inclined surfaces may be provided for the outer rollers of the cover plates which are located one above the other so as to easily mount the non-required cover plates.

A cover plate according to the invention has the further advantage that in contrast to heretofore known arrangements of the type involved, or other cover plates, have the same dimensions because there is no need for the cover plates to differ in their dimensions in contrast to heretofore known devices of the type involved.

In view of the fact that the joints butt each other, each end face may be provided with a transverse wall, and if desired, a plurality of transverse walls may be provided extending over the entire length of the covering unit. In view of these transverse walls, for instance, the rigidness of the cover plates will be considerably increased and the cover plates can be subjected to a higher load.

Figure 1:
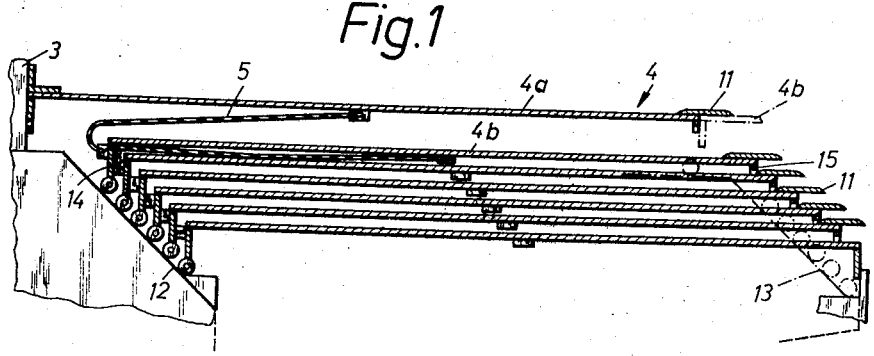
FIGURE 1 is a longitudinal section through piled-up cover plates of an arangement according to the present invention.
Figure 2:
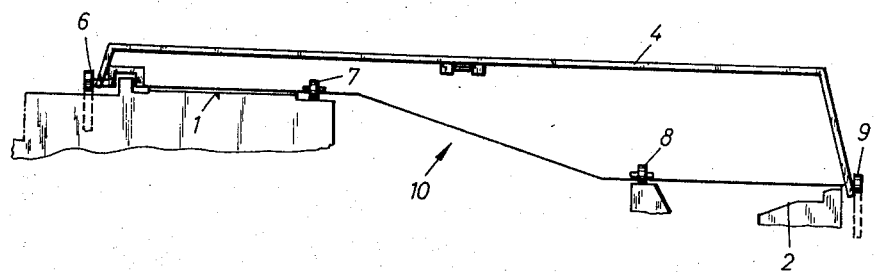
FIGURE 2 is a cross section.

Referring now to the drawings in detail, cover plates 4 are provided, for instance, for covering the guiding paths 1 and 2 of a machine tool on which a carriage 3 (FIG. 1) is adjustable. The cover plates 4 may be bent to form a U while the legs of the U-shaped cover plates are adapted to the level of the guiding path 1 and 2 (FIG. 2). The uppermost cover plate 4a is fixedly connected to the tool carriage 3. Approximately to the center of plate 4a there is linked one end of a pulling member, for instance, a cable 5 the other end of which is linked to the end face of the adjacent plate 4b. When in conformity with FIGURE 1 carriage 3 moves toward the left, plate 4a will be pulled along and subsequently additional plates 4b will follow.

For purposes of guiding the plates 4, for instance, four rollers 6, 7, 8, and 9, are connected to said plates. These rollers move over separate paths which are independent of the guiding path 1 and 2 for the carriage and which are provided on the machine tool bed 10. At the end of each cover plate 4 there is a sealing strip 11 which covers up the joint of two adjacent cover plates as shown in FIGURE 1 on the right-hand side thereof. At the end of the guiding path there are provided two inclined surfaces 12 and 13 on which the outer rollers 6 and 9 of the cover plates move so that those cover plates which have not been pushed one over the other will be stored in the cavities formed by the inclined surfaces. With this arrangement, the inclined surface 13 located at the rear may also be located deeper than the inclined surface 12 in order to assure that the superimposed cover plates 4 will be inclined toward the right at a desired angle so that any liquid such as water grinding liquid or the like which may have accumulated on said plates will run off in conformity with the inclination of said plates.

Since the individual cover plates 4 butt against each other, it is also possible at the joint at each end face of a cover plate 4 to provide a transverse wall, for instance, a front transverse wall 14 and a rear transverse wall 15. The rollers 6, 7, 8, and 9, may be journalled on these transverse walls. In view of these transverse walls, the rigidity of the cover plates will be greatly increased thereby permitting to place said cover plates under a higher load.

It is, of course, to be understood that the present invention is, by no means, limited to the particular construction shown in the drawing, but also comprises any modifications within the scope of the appended claims. Thus, the cover plates according to the present invention are not limited to the two transverse walls 14 and 15 referred to above, but additional transverse walls may be provided.

What I claim is:

1. In an arangement for covering the guiding path of machine tools as a carriage supported on the path moves thereon; a plurality of cover plates adapted to rest in superposed relation at one end of said guiding path with the uppermost one thereof connected to said carriage to be moved in parallelism with said guiding path as the carriage moves along said guiding path, a flexible element connected to about the middle of the underside of each cover plate and the forward end of the cover plate next therebeneath and of such a length that when two succeeding cover plates are in substantially end to end abutting relation, the flexible element leading therebetween will be substantially without slack, first support means for said cover plates extending parallel to a guiding path for supporting and guiding the cover plates during movement, and second support means inclining downwardly from the end of said first support means for permitting all of said cover plates except the said uppermost one thereof to move downwardly in succession when moved toward a superposed position, said cover plates comprise vertically dependant front and rear end portions which are adapted to abut those on adjacent cover plates when said cover plates are supported on said first support means, said cover plates have rollers on the front and rear ends thereof for engaging said first and second support means which comprise first and second supports for the rollers at the front ends of said cover plates and first and second supports separate therefrom for the rollers at the rear ends of said cover plates, said first and second supports for said front end rollers and for said rear end rollers respectively are spaced in the direction of travel of said cover plates a distance about equal to the spacing between the front end rollers and rear end rollers of each said cover plate whereby the said cover plates move in parallelism with themselves along said second supports.

2. An arrangement according to claim 13 in which each said cover plate has a strip projecting rearwardly from its rear end to overlie the front end of the next succeeding cover plate when the cover plates are on said first support means to provide for uninterrupted cover for said guiding path.

References Cited

UNITED STATES PATENTS

| 790,992 | 5/1905 | Williams | 160—202 X |
| 833,058 | 10/1906 | Kidd | 160—202 X |
| 1,018,777 | 2/1912 | Potuin | 160—118 |
| 1,126,864 | 2/1915 | Rankin | 160—222 X |
| 1,562,344 | 11/1925 | La France | 160—118 |
| 1,692,782 | 11/1928 | Mackin | 160—193 |
| 2,831,448 | 4/1958 | Suderou | 160—193 X |

FOREIGN PATENTS 872,856  4/1953  Germany.

PETER M. CAUN, *Primary Examiner.*

U.S. Cl. X.R.

160—223